United States Patent [19]

Langford

[11] Patent Number: 4,953,919
[45] Date of Patent: Sep. 4, 1990

[54] TRACK SUSPENSION SYSTEM

[75] Inventor: Frederic E. Langford, Redmond, Wash.

[73] Assignee: Phoenix Engineering, Inc., Redmond, Wash.

[21] Appl. No.: 311,153

[22] Filed: Feb. 15, 1989

[51] Int. Cl.⁵ .............................................. B62D 55/30
[52] U.S. Cl. ........................................ 305/31; 305/21; 305/29
[58] Field of Search ........................ 305/10, 21, 22, 23, 305/24, 28, 29, 31; 180/9.1, 9.5, 9.52, 9.54, 9.56

[56] References Cited

U.S. PATENT DOCUMENTS

| | | | |
|---|---|---|---|
| 2,105,917 | 1/1938 | Herrington | 305/31 X |
| 2,110,587 | 3/1938 | Bennett et al. | 305/23 |
| 2,467,947 | 4/1949 | Skelton | 305/31 X |
| 2,496,136 | 1/1950 | Smith . | |
| 2,719,062 | 9/1955 | Arps | 305/31 |
| 3,082,044 | 3/1963 | Klemm et al. . | |
| 3,458,214 | 7/1969 | West . | |
| 3,774,708 | 11/1973 | Purcell et al. . | |
| 3,841,424 | 10/1974 | Purcell et al. . | |
| 4,227,749 | 10/1980 | Hesse . | |
| 4,406,501 | 9/1983 | Christensen . | |
| 4,458,954 | 7/1984 | Haas | 305/31 X |
| 4,708,218 | 11/1987 | Makela . | |

FOREIGN PATENT DOCUMENTS

| | | | |
|---|---|---|---|
| 969584 | 6/1975 | Canada . | |
| 976213 | 10/1975 | Canada . | |
| 977012 | 10/1975 | Canada . | |
| 977392 | 11/1975 | Canada . | |
| 981316 | 1/1976 | Canada . | |
| 987708 | 4/1976 | Canada . | |
| 990770 | 6/1976 | Canada . | |
| 1100161 | 4/1981 | Canada . | |
| 1122007 | 5/1987 | Canada . | |
| 6516997 | 12/1967 | Netherlands | 305/31 |
| 189170 | 4/1964 | Sweden | 305/31 |
| 605814 | 7/1948 | United Kingdom . | |
| 844768 | 8/1960 | United Kingdom . | |

Primary Examiner—Russell D. Stormer
Attorney, Agent, or Firm—Christensen, O'Connor, Johnson & Kindness

[57] ABSTRACT

A triangular track suspension system includes a drive sprocket, a track frame having idler wheels mounted on its ends, and a track draped about the drive sprocket and idler wheels. One of the idler wheels is mounted for fore and aft movement relative to the track frame. A take up mechanism is provided that moves the idler wheel in a forward direction as the track frame rocks to maintain a substantially constant circumference around the idler wheels and drive sprocket.

9 Claims, 2 Drawing Sheets

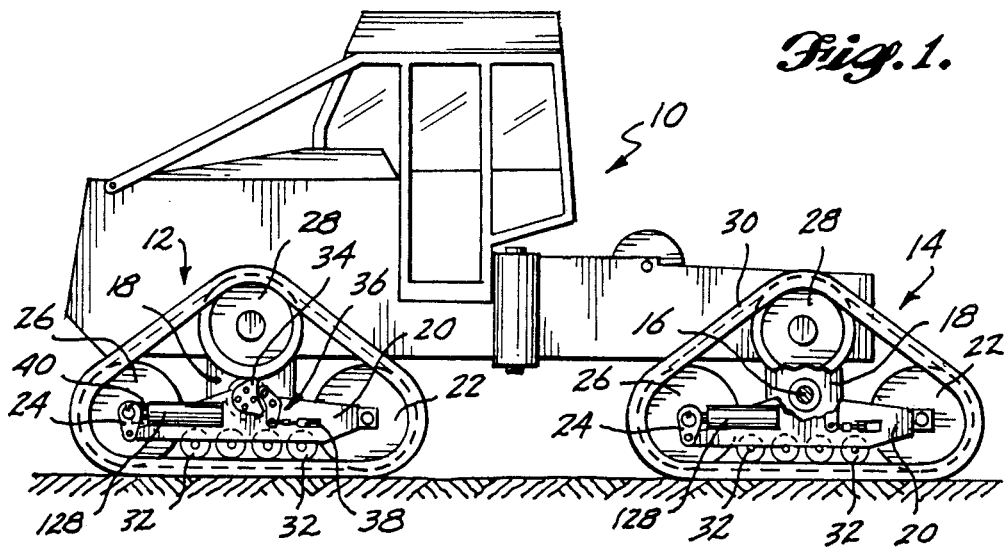
Fig. 1.
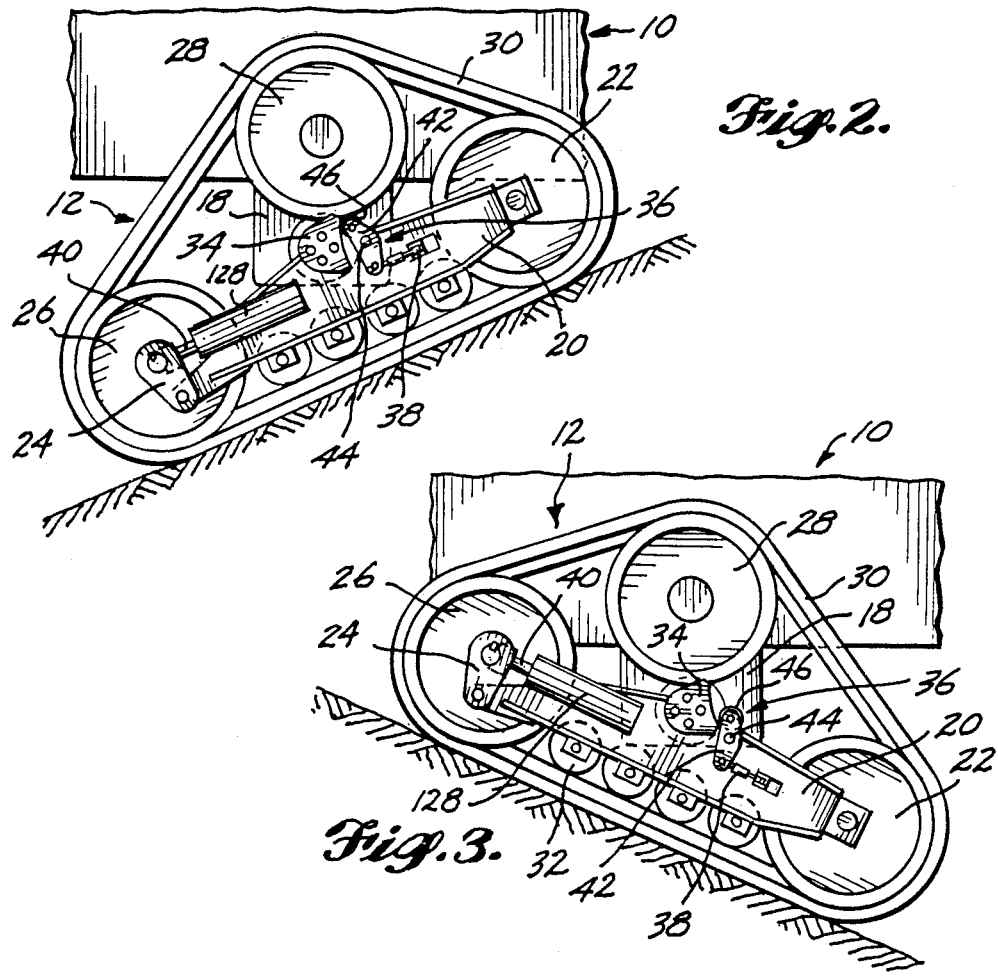
Fig. 2.
Fig. 3.

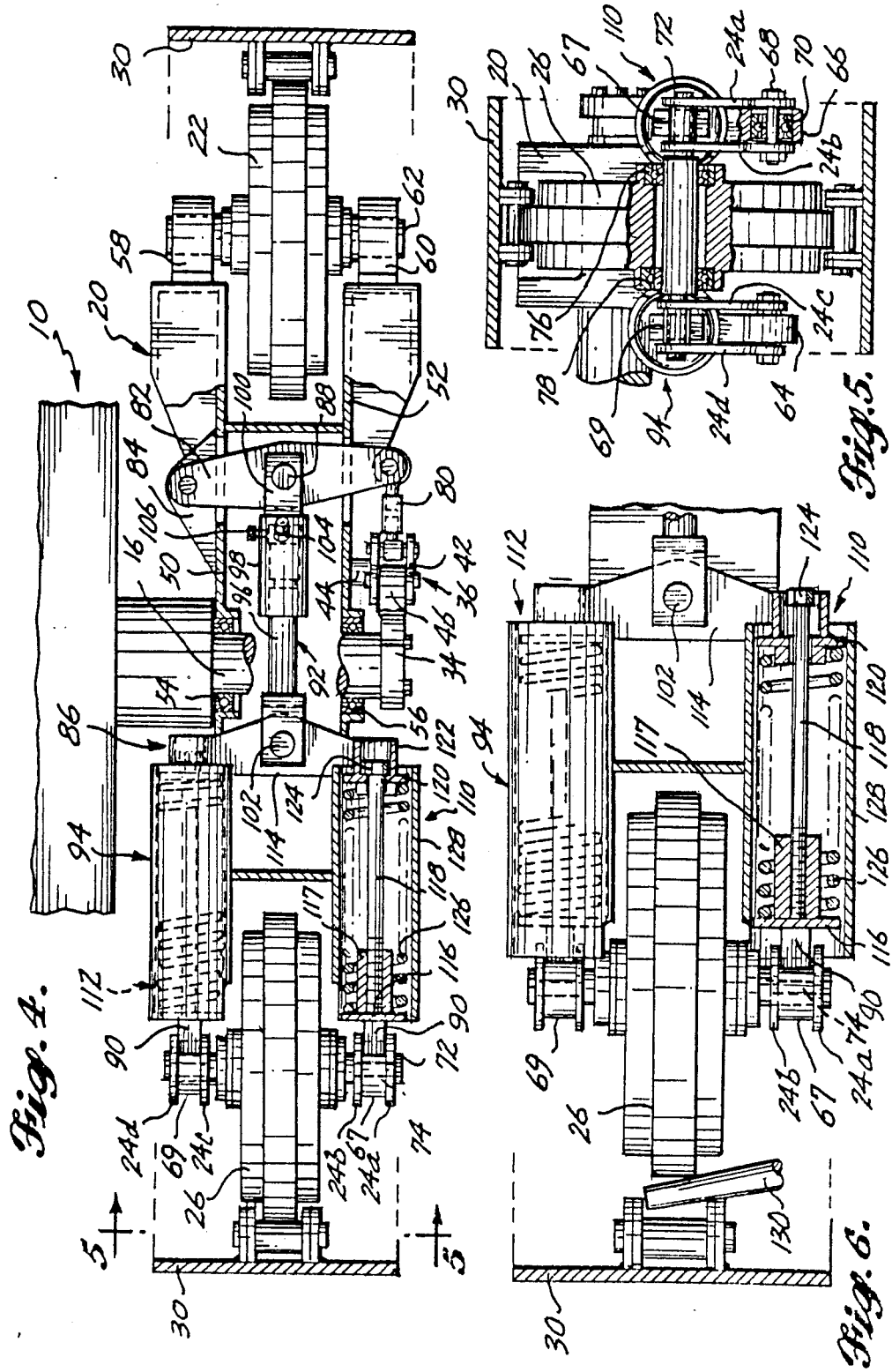

TRACK SUSPENSION SYSTEM

TECHNICAL AREA

The present invention relates to track laying vehicles, and more particularly to a suspension system for a triangular track arrangement.

BACKGROUND OF THE INVENTION

A variety of track suspension systems have been employed in the prior art. A commonly encountered track suspension system includes a front idler wheel and a rear drive sprocket over which the continuous track is draped. Another suspension system is known as a triangular track system in which a track frame is pivotally mounted to a pivot shaft on a vehicle. Front and rear idler wheels are mounted at opposing ends of the track frame. The drive sprocket is rotatably mounted on the vehicle above the pivot shaft. A continuous track engages the drive sprocket and the two idler wheels in a triangular configuration. The advantage of the triangular configuration is that the drive sprocket is mounted above the ground surface, thus freeing it from drit and debris, prolonging its life. Additionally, the drive sprocket construction can be lightened because it is not required to carry a part of the vehicle load.

A distinction of the triangular track system is that as the track frame rocks about the pivot shaft, the geometry associated with the idler wheels and the drive sprocket changes. For example, as the track frame rocks from the horizontal, the circumference around the idler wheels and drive sprocket is reduced, thus causing slack in the track. Slack in the track is undesirable because it allows the track to become disengaged from either the idler wheels or sprocket or both. In addition, a certain amount of preload tension in the track is desirable to maintain the track, idler wheels and sprocket in engagement. The preload tension should be minimal in value and remain essentially constant to minimize wear on the component parts of the track system.

On existing triangular track systems, the angle through which the track frame swings is quite small (on the order of ±3°). The resulting change in circumference is quite small and is usually ignored. In a rough terrain application, such as a log skidder, however, the angle through which the track frame is required to rotate is quite large (on the order of ±30°). The change in circumference brought about by the relatively large rotational angle is significant. A way to minimize the circumference change must therefore be found.

SUMMARY OF THE INVENTION

The present invention provides a suspension system that maintains the circumference around the idler wheels and drive sprocket substantially constant regardless of whether the track frame is in a horizontal position or is rocked away from the horizontal. In this manner the preload tension on the endless track can be maintained at a constant minimum value, thereby minimizing wear on the track pins and links. The track suspension system constructed in accordance with the present invention includes a pivot shaft affixed to the vehicle, a drive sprocket mounted on the vehicle and positioned adjacent and above the pivot shaft, and a track frame having first and second ends is mounted for rocking movement on the pivot shaft at a location between the first and second ends. Means are provided to mount a first idler wheel for rotation and for fore and aft movement on the first end of the track frame. A second idler wheel is mounted for rotation on the second end of the track frame. A continuous track engages the drive sprocket, the first idler wheel, and the second idler wheel. In accordance with the present invention, a take-up means is provided for moving the first idler wheel away from the pivot shaft in reaction to the rocking motion of the track frame away from the horizontal, while maintaining constant circumference around the idler wheels and drive sprocket.

BRIEF DESCRIPTION OF THE DRAWINGS

A better understanding of the present invention can be derived from reading the ensuing specification in conjunction with the accompanying drawings wherein:

FIG. 1 is a side elevation view of an articulated log skidder on which the triangular track suspension system constructed in accordance with the present invention is mounted;

FIG. 2 is an enlarged side elevation view of the track suspension system in accordance with the present invention with the forward end of the track frame tilted downwardly;

FIG. 3 is a view similar to FIG. 2 with the forward end of the track frame tilted upwardly;

FIG. 4 is a partial, longitudinal sectional view through the track frame;

FIG. 5 is an elevation view in partial cross section taken along section 5—5 of FIG. 4; and, FIG. 6 is an enlarged view of the forward portion of the track frame and the front idler wheel in partial cross section.

DESCRIPTION OF THE PREFERRED EMBODIMENT

Referring now to FIG. 1, the track suspension system constructed in accordance with the present invention is mounted on an articulated log skidder 10. The track system, however, can be employed on any type of articulated or nonarticulated vehicle. With the articulated log skidder, two triangular track assemblies are mounted on the left and right sides of the forward portion of the skidder. Only one of these track assemblies 12 can be seen in FIG. 1. Similarly, two triangular track assemblies 14 are mounted on the rear portion of the skidder, again only one of these can be seen in FIG. 1. While it is not necessary, the forward track suspension assembly 12 and the rear track assembly 14 are preferably identical in construction. Each of the track assemblies include a pivot shaft 16, extending horizontally outwardly from a depending bracket 18 in turn mounted to the vehicle frame. A track frame 20 is pivotally mounted near its fore and aft center point in a conventional manner to the pivot shaft 16. A rear idler wheel 22 is rotatably mounted on the aft portion of the track frame 20. An idler wheel link 24 has its lower end pivotally mounted to the forward end of the track frame. The idler wheel link 24 extends generally upward from the forward end of the track frame and terminates in an upward end. A forward idler wheel 26 is pivotally mounted to the upper end of the idler wheel link 24. The track drive sprocket 28, located above the idler wheel shaft, is rotated in a conventional manner by a prime mover (not shown) on the vehicle. A continuous track 30 is draped over the drive sprocket 28, extends forwardly around the forward idler wheel 26, and then extends horizontally, rearwardly to and around the rear idler wheel 22, and thereafter extends back to the drive sprocket. Small intermediate rollers 32 are mounted on the track frame to distribute the vehicle load more evenly over the ground.

As will be described in more detail, a mechanism for taking up slack in the track as the track frame rocks includes a cam 34 affixed to the outer end of the pivot shaft 16. The cam has a rearwardly facing surface and engages a cam follower, generally designated 36, which in turn is coupled to a linkage arrangement, generally designated 38, mounted on the track frame 20. This linkage arrangement is coupled to an arm 40, the forward end of which bears against the upper portion of the idler wheel link 24. When the track frame is in a horizontal position, the cam follower 36 is positioned in the central portion of the surface of the cam 34. As the forward end of the track frame rocks downwardly when it engages sloped terrain, as shown in FIG. 2, the cam follower 36 is moved upwardly relative to the cam 34 causing the cam follower to move rearwardly. This rearward movement is translated through the linkage 38 to the arm 40, moving the arm forwardly and thus moving the upward portion of the idler wheel link 24 forwardly. In this manner, the forward idler wheel is moved forwardly to maintain a substantially constant circumference around the idler wheels and drive sprocket. Similarly, as shown in FIG. 3, when the forward end of the track frame is rocked upwardly, the cam follower 36 moves downwardly relative to the cam 34 causing rearward movement of the cam follower. Again, the movement of the cam follower is translated through the linkage to the arm 40. The forward movement of the arm 40 again moves the upward portion of the idler wheel link 24 forwardly to maintain a substantially constant circumference around the idler wheels and the drive sprocket as the track frame rocks from the horizontal, thereby taking up slack in the track that would otherwise be caused by the rocking movement of the track frame 20.

Referring now to FIGS. 2 and 3 and the more detailed view of FIG. 4, the cam follower 36 includes a crank 42 pivotally mounted in a conventional manner on a pivot shaft 44 extending outwardly from the outer side of the track frame 20. A roller 46 is rotatably mounted at the upper end of the crank 42 at a location above the shaft 44. When the track frame 20 is in a horizontal position, the geometry of the cam follower 36 and the crank 42 is such that the roller 46 is positioned in the central portion of the cam surface. The cam surface curves rearwardly from the central portion in both an upward and downward direction from the central or midpoint. Thus, as the track frame rocks up or down, the roller 46 is moved rearwardly, thus causing the crank 42 to pivot about the shaft 44, in turn causing the lower end of the crank 42 to move in a forward direction.

Referring now to FIGS. 4 and 5, a more detailed description of the construction of the track frame 20 and the linkage system that cause fore and aft movement of the forward idler wheel will be provided. The track frame 20 has basically a box construction with an inner wall 50 and an outer wall 52. The frame 20 is mounted in bearings 54 and 56 on the horizontal pivot shaft 16 for rocking movement. The outer end of the pivot shaft 16 carries the cam 34, which is bolted to the end of the shaft in a conventional manner. The rear end of the box frame splits into a yoke arrangement having an inner arm 58 and an outer arm 60. The axle 62, on which the rear idler wheel 22 is mounted, is journaled in a conventional manner in the arms 58 and 60. The forward end of the track frame also splits into a yoke arrangement having forwardly extending inner arm 64 and outer arm 66. The idler wheel link 24 actually comprises a plurality of link members. Two of the link members 24a and 24b are positioned on each side of the outer arm 66. The lower ends of the link members are coupled together by a bolt 68 extending through and journaled in outer arm 66 by a suitable bearing 70. A companion set of link members 24c and 24d have their lower ends journaled in inner arm 64. All of the link members 24a, b, c, and d extend upwardly from the respective arms 64 and 66. Each pair of links 24a and b and 24c and d are respectively fastened at the upper ends to hubs 67 and 69. The axle 72 for the forward idler wheel 26 extends through suitable bores in the hubs, and is keyed to the hubs by suitable keys 74. The forward idler wheel 26 is then journaled on the axle 72 by suitable bearings 76 and 78.

Still referring to FIGS. 4 and 5, the linkage that couples the cam follower 36 to the link 24 includes a first arm 80 having its forward end pivotally attached to the lower end of the crank 42. Arm 80 extends rearwardly from the crank 42 generally in a horizontal orientation. The rear end of arm 80 is pivotally attached in a conventional manner to the outer end of intermediate crank 82. Intermediate crank 82 extends horizontally and transversely through suitable openings in the outer wall 52 and inner wall 50 of the track frame 20. The inner end of crank 82 extends through the inner wall 50, terminating at a location between the inner wall 50 and the main frame of the articulated skidder 10. The inner end of crank 82 is pivotally attached to flanges 84 positioned above and below the inner end of crank 82 and affixed to the inner wall 50. In this manner, fore and aft movement of first arm 80 caused by movement of the cam follower 36 will cause the central portion of intermediate crank 82 to move fore and aft.

The fore and aft movement of the crank 82 is translated to the axle 72 coupling the upper ends of the link members 24a, b, c, and d by a link generally designated 86, which under normal conditions functions as a rigid link. Link 86, however, contains a link adjustment feature and a force relief mechanism. In essence the rear end of link 86 is pivotally connected by pivot pin 88 to the central portion of intermediate crank 82. The forward end of the link 86 terminates in a pair of saddles 90 that bear on the rear side of hubs 67 and 69. Thus, as the track 20 rocks up and down, cam follower 36 will cause the first arm 80 to move in a forward direction in turn causing the central portion of the intermediate crank to move in a forward direction. This forward movement is translated through link 86 to the axle 72, thus also moving the axle in a forward direction to maintain a substantially constant circumference around the idler wheels and drive sprocket as the track frame rocks from the horizontal.

Link 86 includes two components, a rear length adjustment component 92 and a forward relief component 94. The length adjustment component includes a piston arm 96 that is reciprocally mounted in a cylinder 98. The rear end of the cylinder 98 is coupled to the pivot pin 88 by a rearwardly extending flange 100. The forward end of the piston arm 96 is pivotally coupled by a pivot pin 102 to a transverse arm 114 forming part of the force relief component 94. A conventional lubrication fitting communicates with the interior of the cylinder 98. Grease or other suitable incompressible fluid can be pumped through the lubrication fitting 104 into the interior of the cylinder to force the piston arm 96 forwardly, thus lengthening link 86. To reduce the length of link 86, a relief valve 106 is provided to allow grease to be removed from the cylinder 98. The forward relief component 94 includes a pair of compression spring assemblies 110 and 112 joined by a transverse arm 114 to which the piston arm 96 is pivotally attached. The outer compression assembly 110 is identical to the inner compression assembly 112. Therefore, only one of the assemblies will be described.

Referring now to the compression spring assembly 110, saddle 90 bearing on hubs 67 and 69 is affixed at its rearward end to a circular plate 116. An elongated nut 117 is affixed to the rear end of plate 116. A bolt 118 has its forward end threaded into nut 117 and extends longitudinally rearwardly from the plate 116 through an aperture in a second circular plate 120. A cylindrical shell 122 is affixed to the transverse arm 114, bears against the rearward surface of the second circular plate 120, and surrounds the bolt 118. The head 124 of bolt 118 retains the plate 120 on the bolt, but allows the plate to slide longitudinally relative to the bolt. A compression spring 126 is mounted in compression between the rear surface of circular plate 116 and the front surface of the second circular plate 120. A longitudinally extending cylindrical shell 128 is mounted to the track frame and surrounds the compression spring to keep it free of dirt and debris.

The compression spring assembly normally functions to directly transmit movement of the intermediate crank 82 directly to the saddle 90. However, if as shown in FIG. 6, a piece of debris 130 should become lodged between the track and any of the idler wheels or drive sprocket, the front idler wheel 26 can move rearwardly against the force of the compression springs in the compression assemblies 110 and 112, thus preventing damage to the track suspension system.

The present invention has been described in conjunction with a preferred embodiment. One of ordinary skill will be able to effect various alterations, substitutions of equivalents, and other changes without departing from the broad concepts disclosed herein. For example, the slack takeup mechanism has been disclosed in conjunction with only the front idler wheel. A similar takeup mechanism could be employed alternatively on the rear idler wheel, or conjunctively on both the front and rear idler wheels. It is therefore intended that the protection granted by Letters Patent hereon be limited only by the definition contained in the appended claims and equivalents thereof.

The embodiments of the invention in which an exclusive property or privilege is claimed are defined as follows:

1. A triangular track suspension system for a vehicle comprising:
   a pivot shaft affixed to said vehicle,
   a drive sprocket mounted on said vehicle and positioned adjacent and above said pivot shaft;
   a track frame having first and second ends, said track frame being mounted for rocking movement on said pivot at a location between said first and second ends,
   an idler wheel link pivotally attached to the first end of the track frame and extending upwardly therefrom and terminating in an upward end,
   a first idler wheel mounted for rotation on the upper end of said idler wheel link,
   a second idler wheel and means mounting said second idler wheel for rotation on the second end of said track frame,
   a continuous track engaging said drive sprocket, said first idler wheel, and said second idler wheel, and
   take-up means mechanically linking said idler wheel and link and said vehicle for moving the upper end of said idler wheel link away from said pivot shaft in direct reaction to the rocking motion of said track frame away from the horizontal so as to move said first idler wheel away from said pivot shaft and thereby maintain substantially constant circumference around the idler wheels and drive sprocket.

2. A triangular track suspension system for a vehicle comprising:
   a pivot shaft affixed to said vehicle,
   a drive sprocket mounted on said vehicle and positioned adjacent and above said pivot shaft,
   a track frame having first and second ends, said track frame being mounted for rocking movement on said pivot shaft at a location between said first and second ends,
   an idler wheel link pivotally attached to the first end of the track frame and extending upwardly therefrom and terminating in an upward end,
   a first idler wheel mounted for rotation on the upper end of said idler wheel link,
   a second idler wheel and means mounting said second idler wheel for rotation on the second end of said track frame,
   a continuus track engaging said drive sprocket, said first idler wheel, and said second idler wheel, and
   take-up means for moving the upper end of said idler wheel link away from said pivot shaft in reaction to the rocking motion of said track frame away from the horizontal so as to move said first idler wheel away from said pivot shaft and thereby maintain substantially constant circumference around the idler wheels and drive sprocket, said take-up means including
   a cam affixed to said vehicle,
   a follower engaging said cam, the surface of said cam being shaped to move said cam follower upon rocking movement of said track frame, and
   linkage means coupling said cam follower to said idler wheel link.

3. The track suspsension of claim 2 wherein said cam is affixed to said pivot shaft.

4. The track suspension of claim 3 wherein said follower comprises:
   a roller mounted on one end of a follower crank, the other end of said crank being coupled to said linkage means, and
   means pivotally mounting said follower crank to said track frame.

5. The suspension system of claim 4 wherein said linkage means comprises:
   a first link coupled to the other end of said follower crank and extending therefrom,
   an intermediate crank extending transversely across said track frame and being pivotally mounted thereon, said intermediate crank being coupled to said first link, and
   a second link having a first end bearing against said idler wheel link, and a second end coupled to said intermediate crank.

6. The track suspension system of claim 4 wherein said idler wheel link comprises an axle on which said first idler wheel is rotatably mounted the second link bearing against said idler wheel link.

7. The track suspension system of claim 2 wherein said linkage means is adjustable in length.

8. The track suspension system of claim 7 wherein said linkage means includes means for relieving excessive force on said linkage means.

9. A triangular track suspension system for a vehicle comprising:
- a pivot shaft affixed to said vehicle,
- a drive sprocket mounted on said vehicle and positioned adjacent and above said pivot shaft,
- a track frame having first and second ends, said track frame being mounted for rocking movement on said pivot shaft at a location between said first and second ends,
- a first idler wheel and means mounting said idler wheel for rotation and for fore and aft movement on the first end of the track frame,
- a second idler wheel and means mounting said second idler wheel for rotation on the second end of said track frame,
- a continuous track engaging said drive sprocket, said first idler wheel, and said second idler wheel, and
- take-up means mechanically linking said first idler wheel with said vehicle for moving said first idler wheel away from the pivot shaft in direct reaction to rocking motion of said track frame away from the horizontal, thereby maintaining substantially constant circumference around the idler wheels and drive sprocket.

* * * * *